United States Patent [19]

Grover

[11] Patent Number: 4,702,898

[45] Date of Patent: Oct. 27, 1987

[54] PROCESS FOR THE REMOVAL OF ACID GASES FROM GAS MIXTURES

[75] Inventor: Bhadra S. Grover, Pound Ridge, N.Y.

[73] Assignee: Union Carbide Corporation, Danbury, Conn.

[21] Appl. No.: 920,277

[22] Filed: Oct. 17, 1986

[51] Int. Cl.[4] .................... C01B 17/02; C01B 17/16; C01B 31/20

[52] U.S. Cl. .................... 423/220; 423/228; 423/229; 423/232; 423/234; 423/243; 55/68; 55/73

[58] Field of Search ............... 423/220, 228, 229, 232, 423/234; 55/68, 73

[56] References Cited

U.S. PATENT DOCUMENTS

| | | | |
|---|---|---|---|
| 2,477,314 | 7/1949 | Scharmann | 423/232 |
| 3,823,222 | 7/1974 | Benson | 423/228 |
| 3,896,212 | 7/1975 | Eickmeyer | 423/232 |
| 4,160,810 | 7/1979 | Benson et al. | 423/220 |
| 4,343,777 | 8/1982 | Dannhorn et al. | 423/228 |
| 4,537,753 | 8/1985 | Wagner et al. | 423/228 |
| 4,551,158 | 11/1985 | Wagner et al. | 423/228 |
| 4,553,984 | 11/1985 | Volkamer et al. | 423/228 |

*Primary Examiner*—Andrew H. Metz
*Assistant Examiner*—Anthony McFarlane
*Attorney, Agent, or Firm*—M. N. Reinisch

[57] ABSTRACT

The present invention is directed to an improved process for the removal of acid gases from gas mixtures which significantly decreases the consumption of heat needed for regenerating the rich alkaline scrubbing solution which is used to remove the acid gases from the gas mixtures. The process comprises passing one portion of the scrubbing solution through a steam stripping section and another portion of the scrubbing solution through a flashing section for regeneration wherein the overhead vapors from the steam stripping section are used to heat and strip the scrubbing solution in the flashing section and heat contained within the regenerated scrubbing solution coming from the steam stripping section is utilized to aid in the regeneration of the scrubbing solution in the flashing section.

14 Claims, 2 Drawing Figures

FIG. I

PROCESS FOR THE REMOVAL OF ACID GASES FROM GAS MIXTURES

BACKGROUND OF THE INVENTION

1. Field of the Invention

This invention pertains to an improved process for the removal of acid gases, such as $CO_2$ and $H_2S$, from gas mixtures. More specifically, the present invention significantly decreases the consumption of heat needed for regenerating the rich alkaline scrubbing solution which is used to remove the acid gases from the gas mixtures.

2. Discussion of Related Art

The industrial importance of gas scrubbing processes involving the bulk removal of acid gases, particularly $CO_2$ and $H_2S$, from various raw gas mixtures is steadily increasing. As the demand for synthetic fuels and synthesis gases derived from fuel sources such as natural gas, oil and coal increases, there is an ever-increasing need for efficient processes for the removal of acid gases from the raw gas mixtures that are generated. For example, in the production of synthetic methane from naphtha, fuel oil or coal, the starting material is subjected to reforming or partial oxidation, producing a raw gas containing, e.g., from 20% to as much as 50% of $CO_2$ together with smaller amounts of $H_2S$ where a sulfur-containing starting material is employed. Similarly, in the reforming of natural gas to produce hydrogen for ammonia synthesis or hydrogenation reactions, a raw gas is produced containing usually from 16% to 20% $CO_2$, all of which must be removed prior to the ammonia synthesis step.

A typical system for removing the acid gases from the gas mixtures, as described in, for example, U.S. Pat. Nos. 3,823,222 and 4,160,810, consists of an absorber in which the feed gas containing the acid gas components is scrubbed countercurrently at elevated pressure with an alkaline scrubbing solution. The resulting rich solution containing the scrubbed acid gases is then regenerated by first flashing a minor part of the absorbed acid gases as the rich solution enters the vapor head of a steam stripping column where it is then boiled and steam stripped to form a lean solution capable of being recycled back to the absorber.

In an alternate process, such as described in U.S. Pat. Nos. 4,537,753 and 4,551,158, for example, the steam stripping column of the above process is eliminated and the rich scrubbing solution is regenerated simply by flashing in one or more flash stages.

In U.S. Pat. No. 3,622,267, rich scrubbing solution is flashed and then passed through a steam stripping column. The overhead vapor stream from the steam stripping column containing removed acid gases and steam is introduced into the flashing means and is utilized as an additional stripping medium therein.

However, a need still exists to develop an even more efficient and economical process for the removal of the acid gases by means of a scrubbing solution and the subsequent regeneration of the acid gas-laden scrubbing solution.

SUMMARY OF THE INVENTION

Applicant has discovered an improved process for the removal of acid gases from a gas mixture which process is more efficient and economical than that of the prior art techniques. More particularly, by virtue of the present invention, the amount of external heat needed for the regeneration of the scrubbing solution and the concomitant costs, when compared to the prior art processes, are decreased significantly.

Generally, in its most broadest terms, the present invention uniquely combines both of the prior art regeneration techniques discussed above, namely, the steam stripping system and the flashing system, in such a manner that the low level waste heat sources from the steam stripping system is more efficiently utilized to enhance the regeneration taking place in the flashing system and, in a preferred embodiment, also makes use of heretofore unutilized heat sources from the absorption zone to heat acid gas-laden (rich) scrubbing solutions being introduced to the stripping system thereby decreasing the heat load needed in that stripping system.

More specifically, the improvement of the present invention comprises regenerating the rich solution being taken off from the absorption zone in a regeneration zone which comprises a steam stripping stage and at least two flashing stages wherein:

(a) a first portion of the rich scrubbing solution is passed through the steam stripping section to be regenerated and form a lean solution which is recycled to the absorption zone and a vapor stream containing removed acid gases and steam;

(b) a second portion of the rich scrubbing solution is passed through a flashing stage in which the rich scrubbing solution is flashed to remove acid gases and steam therefrom and form a partially regenerated solution;

(c) the partially regenerated solution is passed through the acid gas stripping stage in which the partially regenerated solution is countercurrently contacted with and stripped by the vapor stream from the steam stripping section to remove acid gases and steam from the partially regenerated solution; and (d) the lean scrubbing solution leaving the steam stripping section is utilized to heat the partially regenerated solution in the flashing section to thereby form steam which strips additional acid gases from the partially regenerated solution.

In a preferred embodiment of the present invention, the absorption zone is comprised of two stages comprising a first stage through which the feed gas is passed and in which the bulk of the acid gases is removed, generally at least about 50% to 75% of the acid gases, and a second stage through which the feed gas is subsequently passed in which additional acid gases are removed. In this preferred embodiment, the scrubbing solution used in the first stage is preferably regenerated by flashing and countercurrent stripping with removed, waste acid gas/steam mixtures utilizing the heat from the lean solution leaving the steam stripping section to aid in acid gas removal whereas the scrubbing solution used in the second stage is regenerated by pressure reduction followed by boiling and steam stripping.

By utilizing the overhead vapor stream from the steam stripping part of the regeneration zone which contains the removed acid gases and steam as a stripping medium in the flashing part of the regeneration zone and by utilizing the low level heat from the lean solution leaving the steam stripping section in the flashing section to form additional steam which aids in stripping the acid gases from the rich solution in the flashing section, a number of advantages are realized:

1. It eliminates the need for external heat to reheat the flashed regenerated scrubbing solution. As is well known to those skilled in the art, heat addition is necessary to reheat the solution to the original absorption temperature to make up for the heat lost to heat of vaporization during flashing which causes a temperature drop in the solution. Unless the solution is reheated, further flashing of acid gases cannot be sustained on a continuous basis.
2. It results in lower acid gas concentrations in the regenerated solution as compared to solutions which are simply flashed leading to a lower equilibrium back pressure of $CO_2$ from the solution in the first stage of the absorption zone permitting a greater portion of $CO_2$ to be removed in that stage. The $CO_2$ removed in the first stage of the absorption zone requires no external heat for its desorption.
3. It results in greater absorption of the acid gas per unit of absorbing solution being circulated thereby lowering the circulation requirements.
4. The lower acid gas concentration in the solution also permits the addition, if desired, of rich solution from the second stage of the absorption zone to the first stage so as to remove additional acid gases in that stage which further reduces solution circulation.

In another embodiment of the present invention, Applicant has discovered that further decrease of external heat input into the process can be achieved by flashing the rich scrubbing solution in two or more stages with direct contact of the removed, waste acid/gas steam mixture at an intermediate flash pressure. Thus, for pressure reduction in two steps, the direct contact heating and stripping with the waste acid gases/steam mixture is preferably carried out after the first flash stage.

By means of the present invention, it is possible, for example, to reduce the external heat requirements for removing $CO_2$ from ammonia synthesis gas to a range of from 15,000 to 20,000 BYU/lb mole of $CO_2$ removed. This compares to about 45,000 to 55,000 BTU/lb mole of $CO_2$ for systems without internal heat recovery.

DETAILED DESCRIPTION OF THE INVENTION

Figure 1:
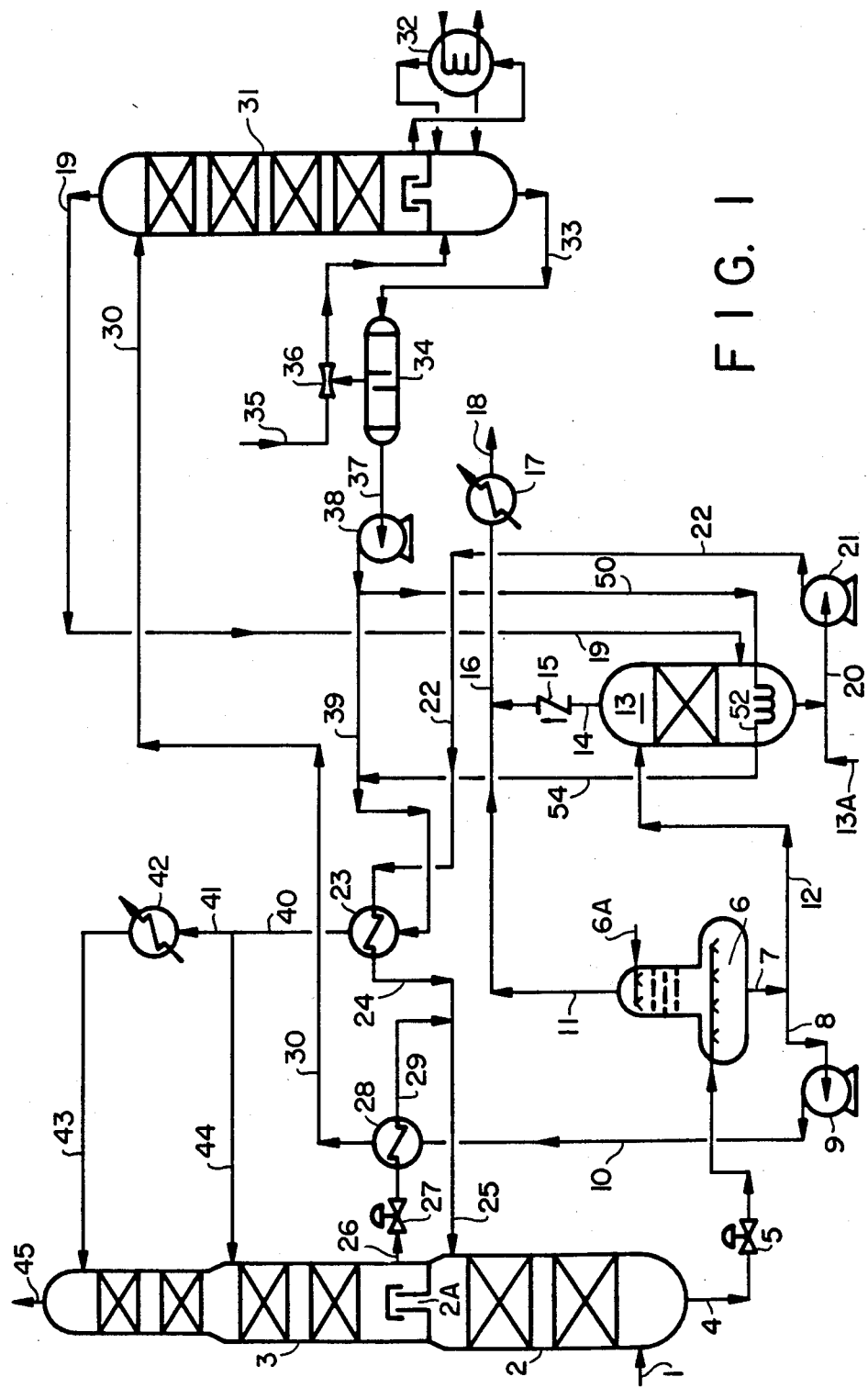
FIG. 1 is a schematic flowsheet of the present invention using one stage pressure reduction followed by direct contact heating and stripping with a waste acid gases/steam mixture in conjunction with heating utilizing the lean solution leaving the steam stripping section as a source of low level heat.

The invention is applicable to systems using any regenerable aqueous alkaline scrubbing solution including aqueous solutions of alkali metal carbonates, particularly potassium carbonate, aqueous solutions of ethanolamines, or alkali metal phosphates. Particularly preferred are relatively concentrated potassium carbonate solutions having potassium carbonate concentrations of 15 to 45% and preferably from 20 to 35% by weight.

Potassium carbonate solutions are preferably activated by the addition of additives such as amines, particularly ethanolamines and sterically hindered amines, alkali metal borates such as potassium borate or sodium borate, arsenic compounds such as oxides, phosphates either individually or in combination, and amino acids such as glycine or other additives which tend to increase the rates of absorption and desorption of acid gas in the potassium carbonate solution.

A convenient way to define the $CO_2$ content of alkaline carbonate solutions is by the use of the term "fraction conversion of the carbonate" designated by Fc. The Fc is the fraction of the alkaline carbonate converted to bicarbonate. Thus, a lean solution will have a lower Fc (about 0.20-0.40) than a rich solution (about 0.70-0.95). Generally, a rich solution is limited to a maximum Fc of about 0.95 since an Fc of 1.0 would indicate complete conversion to bicarbonate which is physically impractical.

By means of the present invention in which a portion of the rich scrubbing solution is flashed followed by direct contact heating and stripping with a waste acid gas/steam mixture and in which heat from the lean solution leaving the steam stripping section is utilized to form steam in either the flashing stage or in the direct contacting stage which aids in acid gas removal, it has been found that the Fc is decreased to about 0.60 to about 0.65 from an original value of 0.90. In contrast, in the prior art technique in which the rich scrubbing solution is merely flashed, it is expected that starting with an Fc of 0.90, the final solution after flashing will have an Fc of about 0.70 to 0.75. The ability of the present invention to lower the Fc to an even greater extent than has been common in the prior art results in a decrease in the scrubbing solution circulation rate of about 40 to 50% for the same amount of $CO_2$ removal. So too, the lower Fc resulting from the direct contacting step of the waste acid gas/steam mixture and the utilization of the low level heat from the lean solution leaving the steam stripping section, allows for the addition, if desired, of rich solution from the second stage of the absorption zone to the first stage in the embodiment in which two stages are used. This decreases the respective amount of scrubbing solution needed for the first stage of absorption.

In the preferred embodiment of the present invention in which two stages are used for absorption, the amount of $CO_2$ removed in the first stage will generally range from about 50 to 75% of that removed totally. The amount of removal will depend on the $CO_2$ concentration and pressure of the feed gas. The preferred range of $CO_2$ partial pressure of the gas leaving the first stage of the absorption zone is 25 to 60 psi, but the invention can be advantageously used at $CO_2$ partial pressures of from 15 to 100 psi at this point.

While it is desireable to remove a large portion of the acid gas in the first stage of the absorption zone, there is an optimum limit for each gas composition. There should be a sufficient amount of $CO_2$ removed in the second stage of the absorption zone so that enough of the scrubbing solution leaving this second stage and being regenerated at the steam stripping section of the regeneration zone has a steam and $CO_2$ mixture of suitable composition and quantity for the direct contact step of the present invention and for the utilization of the low level heat therein. More particularly, in the direct contact heating and stripping of the rich solution from the first stage of the absorption zone, after pressure reduction, the vapor leaving the regenerator must have high enough steam partial pressure and low enough $CO_2$ partial pressure and be of sufficient quantity to heat and strip the flashed solution on direct countercurrent contact.

Flashing the rich solution in two stages or more, which includes heating and stripping by direct contact with the acid gas/steam mixture coming from the stripping stage as overhead after the first stage of pressure reduction generally provides better results that a one stage flashing step which is followed by the direct contact step. This is due to the Fc and solution temperature at the intermediate flash pressure being higher than after the final pressure reduction step. The equilibrium vapor pressure of the $CO_2$ is higher therefore and more $CO_2$ stripping can be achieved by contacting the acid gas/steam mixture. Moreover, by preheating the solution with the direct contact step prior to the next flashing stage, more flashing of $CO_2$ occurs. More than two flash stages may be used with the direct contact step being applied at the most suitable intermediate pressure. Hereinafter, scrubbing solution which has been regenerated by means of flashing and direct contact heating and stripping with a waste acid gas/steam mixture in conjunction with the utilization of low level heat from the lean solution coming from the steam stripping section shall be referred to as "pressure swing solution".

The low level heat present in the lean solution coming from the steam stripping section of the regeneration zone may be utilized in a flashing stage to from additional steam for stripping the acid gases in the flashing stage and/or can be utilized in an acid gas stripping stage (also referred to herein as a "direct contactor") where the direct contact of rich solution is made with a waste acid gas/steam mixture coming from the steam stripping section in which acid gas stripping stage steam may also be formed to help strip acid gases from the rich solution. Still further, the low level heat from the lean solution of the steam stripping section may also be used to heat the relatively colder lean solution coming from the flashing section of the regeneration zone prior to being recycled back into the absorber.

The invention is best described and illustrated by the following Examples. The feed gas for these Examples is an ammonia synthesis gas of 1000 metric tons of $NH_3$/day of capacity. The flow rate is about 15,000 lb moles/hr dry gas and the gas is at 410 psia and 200° F. as it is being introduced to the absorption zone. The gas contains 2,700 lb moles/$CO_2$/hr (18 mole percent) and is water saturated.

The absorption zone used in the Examples consists of two stages and is comprised of an absorption column having a bottom (first stage) portion and a top (second stage) portion. The top absorber can have a single stream of regenerated scrubbing solution entering into it or, as used in the Examples, a split stream may be employed. In both Examples, the feed gas leaves the bottom absorber at a $CO_2$ concentration of about 8.0 mole % such that about 1650 lb mole $CO_2$/hr is removed in that bottom absorber. The remaining $CO_2$ is removed in the top absorber to a residual concentration of 0.10 mole %, amounting to the removal of about 1040 lb mole $CO_2$/hr in the top absorber.

EXAMPLE 1

Referring to FIG. 1, the feed gas enters the bottom absorber 2 by line 1 at 200° F. and 410 psia. Countercurrently, a combined hot stream of alkaline carbonate solution, consisting of about 72% by weight of pressure swing solution from line 24 and the remainder being partially cooled rich solution coming from top absorber section 3, enter the top of bottom absorber section 2. The solution from top absorber section 3 leaves via line 26, flows through heat exchange 28 into line 29 and combines with the pressure swing solution in line 25. All columns contain either conventional packing or trays.

Partially scrubbed gas leaves the bottom absorption section 2 and flows through chimney tray 2a to the top absorber section 3. The hot, rich solution leaves absorber section 2 via line 4 and pressure reducing valve 5 to enter flashing chamber 6 in which $CO_2$ and steam are flashed. A small stream of water may enter the flashing chamber via line 6a to decrease entrainment of the solution. The characteristics of the rich solution prior to flashing and after flashing are set forth in Table I below.

The solution leaving flashing chamber 6 through line 7 is divided. A minor poriton of sufficient quantity to remove the desired amount of $CO_2$ in the top absorper section 3, about 28% by weight, flows through line 8, is boosted in pressure by pump 9, and flows to solution/solution heat exchanger 28 through line 10. In a variation (not shown), pump 9 can be eliminated by splitting stream 4 into two streams, one stream going directly to regenerator 31 and the other stream being introduced into chamber 6. In this embodiment, the pressure contained in the absorber alone is sufficient enough to drive the solution stream to the regenerator without the need for a pump.

The major portion of the solution flows through line 12 to direct contactor 13 for countercurrent heating and stripping by the overhead vapor stream leaving regenerator 31 flowing through line 19. Direct contactor 13 is heated by heat exchanger 52 which is fed with lean solution coming from regenerator 31 via line 50. Regenerator 31 is operated at a top pressure which is high enough to just allow the overhead vapor to flow through direct contactor 13, line 14 and check valve 15 to acid gas cooler 17. Acid gas is discharged from line 18. The solution leaving direct contactor 13 has the characteristics set forth in the third column of Table I below. In the direct contactor, the Fc has been lowered from 0.698 to 0.67 and the solution heated from 194° F. to 199° F. at which it can sustain the exit conditions of the rich solution exiting bottom absorber section 2.

It should be noted that the amount of $CO_2$ recovered in each section of the absorber and the amount of solution circulated in each section should preferably be such that the overhead vapor from the regenerator will provide sufficient quantities and suitable partial pressures of steam and $CO_2$ to be able to heat and strip $CO_2$ from the after flash solution in the direct contactor. The partial pressure of the steam entering the direct contactor should be high enough such that there is a positive driving force from the vapor to the solution even after part of the steam condenses to provide heat for heating the solution and for the endothermic decomposition of the bicarbonate. At the same time, the $CO_2$ partial pressure throughout the contactor must be low enough so that there is a driving force for $CO_2$ stripping from the solution to the vapor. The $CO_2$ that is stripped in the direct contactor adds to that originally in the entering vapor so that the $CO_2$ partial pressure in the vapor increases. For both the steam and the $CO_2$, the limiting conditions as to the amount of stripping and heating that can take place in the direct contactor are defined by the composition and quantity of the $CO_2$ and steam in the overhead vapors entering the direct contactor, and of the Fc and temperature of the flashed rich solution which is being contacted with the overhead vapors. Generally, the amount of regenerated solution fed to the top section of the absorber will be 20% to 40% of the total feed being fed to both absorber sections. In this Example, the amount fed to the top absorber section 3 is about 30%.

The solution from the direct contactor 13 flows through line 20 and to pump 21 for return to absorber bottom section 2 via line 22. This solution flows to heat exchanger 23 which is provided to increase the solution temperature before it combines via line 24 with the rich solution from top section 3 flowing in line 29. The heat utilized for heat exchanger 23 is derived from the low level heat present in the lean solution coming from regenerator 31 via line 39. As noted, the overhead vapors from direct contactor 13 flows through line 14, check valve 15 and then combines with the flashed gas from chamber 6 flowing in line 11. The combined vapor stream flows through line 16 to acid gas cooler 17 and exits by line 18.

The minor portion of solution from chamber 6 after being heated in heat exchanger 28 flows through line 30 to regenerator 31 for boiling and stripping. Steam is obtained in reboiler 32 in which the solution is boiled using heat supplied from an external source, preferably the hot synthesis feed gas. Heat is also supplied via the steam ejectors 36 which boost the pressure of steam generated by flashing of the lean solution at a pressure below that in the regenerator in flash tank 34. Steam is fed to the ejectors by line 35. This motive steam may be generated in a condensate reboiler using heat in the synthesis gas as described in U.S. Pat. Nos. 3,823,222 and 4,160,810. Steam from another external source may also be used.

The lean solution leaves flash vessel 34 by line 37 and then is pumped by pump 38 through line 39 to heat exchanger 23 where some of the heat contained therein is tuilized to heat the colder pressure swing solution prior to its being recycled to the absorber. Pump 38 also pumps a portion of the lean solution to heat exchanger 52 contained within direct contactor 13 which is then passed via line 54 to be combined with remaining lean solution in line 40. The combined lean solution then flows through line 40 to top section 3 of the absorber. Part of the solution is directed through line 41 to cooler 42 before it enters the top of the column by line 43. Most of the lean solution (about 75%) uncooled is fed to an intermediate point of absorber section 3 via line 44. Purified gas leaves the absorber top section 3 by line 45 and contains 0.10 mole % $CO_2$ or less.

The rich solution is withdrawn from top absorber section 3 through line 26 and level control valve 27 to flow to heat exchanger 28. It leaves by line 29 to combine with the pressure swing solution with the combined stream entering the bottom absorber section 2 via line 25.

The net external heat (sum of the heat to reboiler 32 an the steam to ejectors 36) to operate the process described in this Example amounts to about 20,300 BTU/lb mole of $CO_2$. For a regeneration process using a flashing technique without the direct contact step of the present invention with the exact same internal heat recovery provided for the regenerator (flash vessel 34 and ejectors 36 at the same conditions), the net external heat amounts to about 31,000 BTU/lb mole of $CO_2$.

EXAMPLE 2

Figure 2:
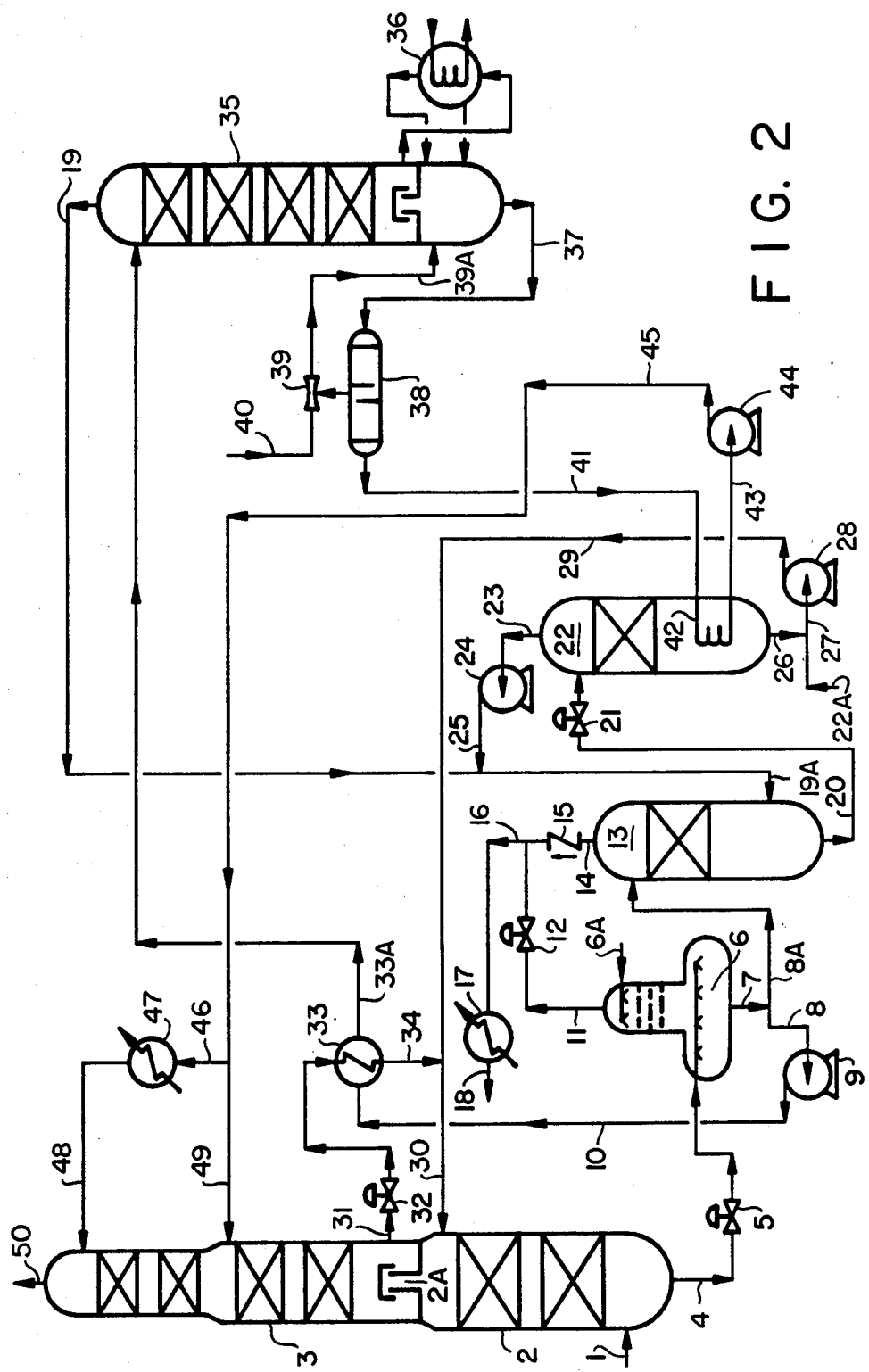
FIG. 2 is a schematic flowsheet of another embodiment of the present invention using two-stage pressure reduction with direct contact heating and stripping with a waste acid gases/steam mixture between the two flashing stages utilizing heat from the lean solution leaving the steam stripping section in conjunction with the second flashing stage.

FIG. 2 illustrates the two-stage pressure reduction of the rich solution coming from the bottom section of the absorber. More stages of pressure reduction may also be used.

Feed gas enters at line 1 for entry to bottom absorber section 2 and is scrubbed by the combined solution entering at line 30. This solution consists of a minor portion (25 to 35%) of partially cooled rich solution coming from top absorber section 3, 30% in this Example, with the remainder of the solution coming from the pressure swing zone. Partially purified gas flows upwardly through tray 2a to the top section of the absorber for final purification. Rich solution from the bottom absorber exits via line 4 through pressure reducing valve 5 to flashing chamber 6 where it is reduced to 22.7 psia. Water may be added through line 6a. The flashed gas exits the top of chamber 6 via line 11 and pressure regulator 12. The solution leaves chamber 6 via line 7 and a portion sufficient for the top absorber 3 is withdrawn via line 8. It is boosted in pressure by pump 9 and flows through line 10 to the solution/solution heat exchanger 33. The characteristics of the solution at this point are set forth at the fourth column in Table I below.

The major portion of the solution leaving chamber 6 via line 7 flows through line 8a to direct contactor 13. This solution is heated and stripped by a steam and $CO_2$ mixture most of which (69% in this Example) is the overhead from regenerator 35. The remainder is the overhead from the final flash and stripping in vessel 22 which is compressed and enters with the regenerator overhead via line 19a. The overhead vapor leaves vessel 13 by line 14, flows through check valve 15 and combined with the flashed vapor from chamber 6. After combining, the acid gas vapor flows through line 16 and to cooler 17 for discharge or recovery via line 18.

Solution from the direct contactor 13, heated and stripped from its entering condition leaves via line 20. In the present Example, the solution is heated from 203° F. to 206° F. and the Fc is lowered from 0.757 to 0.73 in contactor 13. The solution flows through pressure reducing valve 21 to vessel 22 operated at the final flash pressure of 15 psia. Heat is added at the base via heat exchanger 42. The heat is supplied by cooling of the lean solution used in the top absorber section. The heating of the solution causes the formation of steam which, in turn, helps the removal of yet additional acid gases from the scrubbing solution by the stripping occurring with this formed steam. Steam and $CO_2$ vapors leave the top of vessel 22 by line 23 and are boosted to the pressure of the overhead vapor of the regenerator (about 22.7 psia in this case) by compressor 24. This compressed vapor flows through line 25 to combine with the regenerator overhead vapors flowing in line 19 for entry at the bottom of direct contactor 13.

The pressure swing solution at its final condition (see the laast column in Table I below) has an Fc equal to 0.648 and 199° F. leaves vessel 22 via line 26, and continues through line 27 to pump 28 for return to the top of the bottom absorber section 2 through lines 29 and 30. Makeup water may be added through line 22a.

The minor portion of solution from intermediate flashing chamber 6 flows through line 10 to heat exchanger 33 where it is heated before flowing through line 33a to regenerator 35. The solution is stripped by steam generated in reboiler 36 heated externally by hot synthesis gas or by heat from other sources. The lean solution is thoroughly regenerated to an Fc of 0.33 to provide for the final purification. It leaves regenerator 35 through line 37 and is reduced in pressure in flash vessel 38 to flash low pressure steam. This steam is returned to regenerator 35 by ejectors 39 and line 39a to decrease external heat requirements. Motive steam for the ejectors enters by line 40.

The lean solution leaves flash tank 38 through line 41 and flows to heat exchanger 42 providing heat to the second flash stage. It then flows through line 43 to pump 44 and line 45. The lean solution is then divided into a smaller part which flows through line 46 and cooler 47 to enter the top of absorber section 3 by line 48, and a larger part which flows uncooled through line 49 to a lower entry of absorber section 3 via line 50. Rich solution is withdrawn from the chimney tray 2a at the bottom of absorber section 3 via line 31 and through level control valve 32 to heat exchanger 33 where it is cooled slightly. Finally, it flows through line 34 to be combined with the pressure swing solution before entry to the bottom absrober section 2 via line 30.

Regenerator 35 operates at a top pressure slightly above the intermediate rich solution flash pressure of 22.7 psia to permit the vapor to flow through direct contactor 13 and gas cooler 14. The net external heat input for this Example (reboiler heat plus motive steam) for the same 1000 metric ton/day $NH_3$ plant as in Example 1 is about 17,000 BTU/lb mole $CO_2$.

A comparison of the pressure reduction flashing based on the above examples is set forth below in Table I:

TABLE I

|  | Rich Soln. Before Flash | 1-Stage Flash No Direct Contact | 1-Stage[a] Flash With Direct Contact | 2-Stage[a] Flash With Intermediate Direct Contact | |
|---|---|---|---|---|---|
|  |  |  |  | Stage 1 | Stage 2 |
| Weight (lbs/hr) | 3,980,000 | 3,880,000 | 3,867,000 | 3,900,000 | 3,850,000 |
| After Flash Pressure (psia) | before flash | 15 | 15 | 22.7 | 15 |
| $F_c$ | 0.903 | 0.698 | 0.670 | 0.757[b] | 0.648 |
| Temp. (°F.) | 213 | 194 | 199 | 203 | 199 |
| $CO_2$ flashed (lb mols/hr) | — | 1600 | 1800 | 1300 | 840[c] |

[a]Based on total rich solution being processed in all steps.
[b]Direct contact heating and stripping prior to stage 2 flash results in an $F_c$ = 0.73 and temp. of 206.1° F.
[c]Includes 210 lb moles $CO_2$ stripped in direct contactor.

The rich solution of Fc of 0.90 can be obtained in the pressure swing operation because of the relatively low operating temperature in the bottom absorber section, i.e., about 198° to about 213° F. In the conventional operation of the absorber without pressure swing solution being used, the rich solution Fc is generally no greater than about 0.80 to 0.83 due to the higher temperature at the bottom of the absorber which is about 20° to 50° F. higher in conventional techniques, i.e., about 230° to about 260° F. Due to the higher temperature, the equilibrium pressure of $CO_2$ of the solution approaches that of the feed gas at a lower conversion (Fc).

In the process of the present invention, it is possible to use two totally different alkaline scrubbing solutions. One solution would be recycled between the top section of the absorber and the steam stripping column whereas the other solution would be recycled between the bottom section of the absorber and the flashing, direct contacting regeneration system.

What is claimed is:

1. In a cyclic process for the removal of acid gases from a feed gas by means of an aqueous alkaline scrubbing solution which is continuously recycled between an absorption zone in which said acid gases are absorbed by said scrubbing solution to form a rich scrubbing solution and a regeneration zone in which said acid gases are desorbed from said rich scrubbing solution to form a lean solution, the improvement which comprises regenerating the rich solution in a regeneration zone which comprises (1) a steam stripping section and (2) and a flashing section containing at least one flashing stage and an acid gas stripping stage wherein:

(a) a first portion of the rich scrubbing solution is passed through the steam stripping section wherein it is regenerated to form a lean solution which is recycled to the absorption zone and a vapor stream containing removed acid gases and steam;

(b) a second portion of the rich scrubbing solution is passed through a flashing stage in which the rich scrubbing solution is flashed to remove acid gases and steam therefrom to form a partially regenerated solution;

(c) the partially regenerated solution is passed through the acid gas stripping stage in which the partially regenerated solution is countercurrently contacted with and stripped by the vapor stream from the steam stripping section to remove acid gases and steam from the partially regenerated solution; and (d) the lean scrubbing solution leaving the steam stripping section is utilized to heat the partially regenerated solution in the flashing section to thereby form steam which strips additional acid gases from the partially regenerated solution.

2. The process of claim 1, wherein the first portion of rich scrubbing solution is flashed prior to entering the steam stripping section.

3. The process of claim 2, wherein the first portion of rich scrubbing solution is flashed in the flashing stage in which the second portion of rich scrubbing solution is flashed.

4. The process of claim 1, wherein the feed gas is a hot, steam-containing gas.

5. The process of claim 4, wherein the first portion of the rich scrubbing solution is indirectly heated in the steam stripping section with the hot steam-containing feed gas.

6. The process of claim 1, wherein the lean scrubbing solution leaving the steam stripping section is flashed prior to being recycled to the absorption zone to remove low pressure steam, which steam is recycled back to the steam stripping section.

7. The process of claim 1, wherein the absorption zone is comprised of two stages comprising a first stage through which the feed gas is passed and in which the bulk of the acid gases are removed and a second stage through which the feed gas is subsequently passed in which additional acid gases are removed.

8. The process of claim 7, wherein lean solution regenerated in the steam stripping section is recycled to the second stage of the absorption zone and lean solution regenerated in the flashing section is recycled to the first stage of the absorption zone.

9. The process of claim 7, wherein partially rich scrubbing solution from the second stage of the absorption zone is introduced as a scrubbing solution in the first stage of the absorption zone.

10. The process of claim 9, wherein the partially rich scrubbing solution from the second stage of the absorption zone, prior to being introduced as a scrubbing solution in the first stage of the absorption zone, is used to indirectly heat the first portion of rich scrubbing solution which is being introduced into the steam stripping section and which has previously been flashed to remove acid gases.

11. The process of claim 7, wherein the first portion of rich scrubbing solution is taken off from the second stage of the absorption zone and the second poriton of the rich scrubbing solution is taken off from the first stage of the absorption zone and where each portion is a different alkaline scrubbing solution.

12. The process of claim 7, wherein the lean solution leaving the steam stripping section is used as a scrubbing solution in the second stage of the absorption zone and the lean solution leaving the flashing section is used as a scrubbing solution in the first stage of the absorption zone.

13. The process of claim 7, wherein the temperature in the first stage of the absorption zone is in the range of from about 198° to 213° F.

14. The process of claim 1, wherein after the partially regenerated solution passed through the acid gas stripping stage, it is then passed through one or more additional flashing stages and where the flashed acid gases and steam from these additional flashing stages are introduced as a stripping medium in the acid gas stripping stage.

* * * * *

UNITED STATES PATENT AND TRADEMARK OFFICE
CERTIFICATE OF CORRECTION

PATENT NO. : 4,702,898
DATED : October 27, 1987
INVENTOR(S) : Bhadra S. Grover

It is certified that error appears in the above-identified patent and that said Letters Patent is hereby corrected as shown below:

Column 7, line 41, "tuilized" should read --utilized--.

Column 8, line 59, "laast" should read --last--.

Column 12, line 5 (claim 11, line 3), "porition" should read --portion--.

Signed and Sealed this

Fourth Day of October, 1988

Attest:

DONALD J. QUIGG

Attesting Officer

Commissioner of Patents and Trademarks